June 14, 1927.
C. E. BEAULAC
MOVABLE HEADLIGHT
Filed Aug. 14, 1924
1,632,691
2 Sheets-Sheet 2
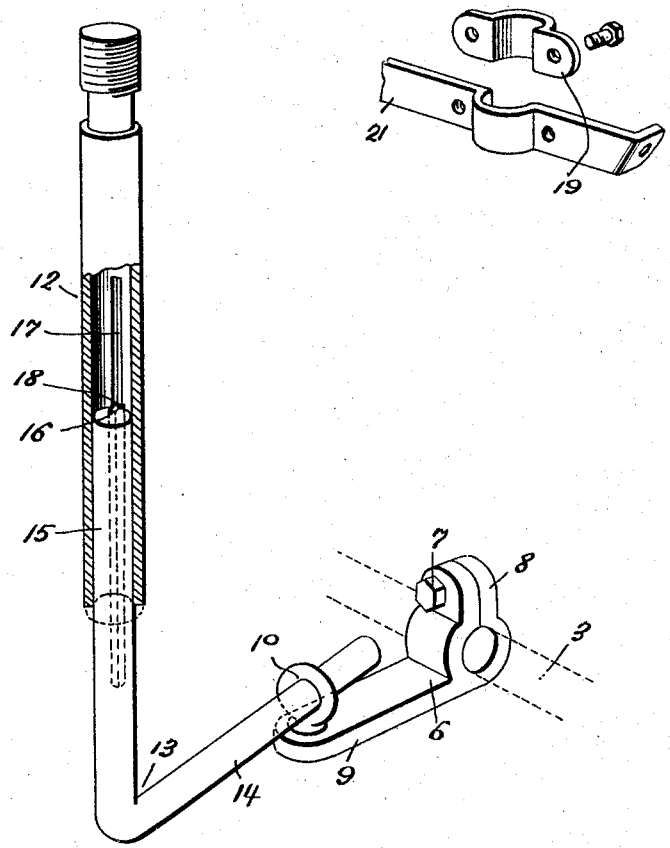
Charles E. Beaulac.
INVENTOR
BY Victor J. Evans,
ATTORNEY
WITNESS:

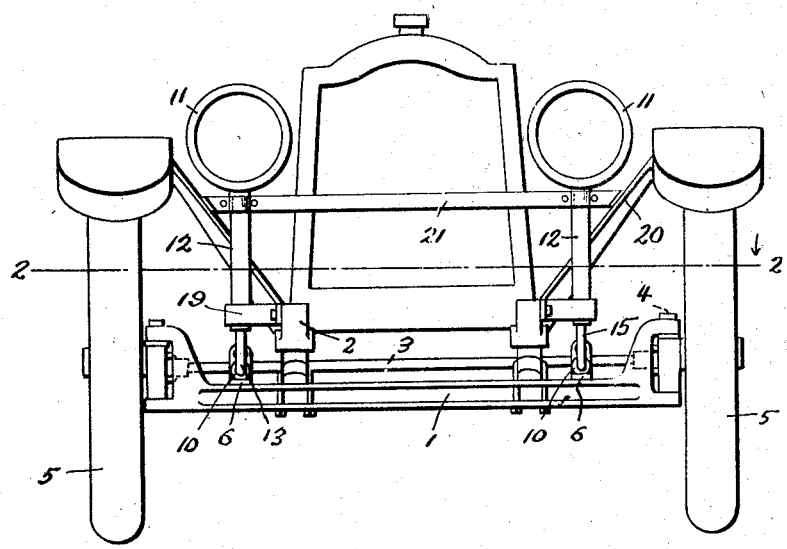

Patented June 14, 1927.

1,632,691

UNITED STATES PATENT OFFICE.

CHARLES EDWARD BEAULAC, OF BARTLETVILLE, ALBERTA, CANADA.

MOVABLE HEADLIGHT.

Application filed August 14, 1924. Serial No. 732,059.

This invention relates to improvements in headlight controls for motor vehicles and primarily constructed to produce a device by means of which the headlights of the vehicle will turn to throw their rays at an angle to the car whenever the wheels of the car are turned to steer the same.

The primary object of the invention resides in the provision of a novel construction of lever arm to facilitate a positive connection thereof with the lamp standard, to not only permit of a vertical movement of the arm through the lamp standard so that injury cannot occur to the headlamps when the vehicle travels over rough surfaces, but also will not necessitate the continuous use of one hand of the driver to operate the search light at a time when he needs both hands to control and run the car.

Finally, the object of my invention is to provide a device of the above stated character, that will be strong, durable, simple and efficient and comparatively easy to construct and also one that will not likely get out of working order.

With the above and other objects in view, the invention further includes the following novel features and details of construction to be hereinafter more fully described, illustrated in the accompanying drawings and pointed out in the appended claim.

Figure 1 is a front elevation of an automobile provided with my improvement.

Figure 2 is a detail plan view of the steering mechanism.

Figure 3 is a perspective view of the lever arm illustrated connected with the rod of the steering mechanism, and connected also to one of the lamp standards, the latter being partly shown in section.

Figure 4 is a detail perspective view of one of the clamps holding the lamp standards to the frame of the vehicle.

Referring to the accompanying drawings in detail, wherein like characters of reference denote corresponding parts, the numeral 1 denotes the front axle of the motor vehicle, 2 the frame thereof and 3 the usual transverse steering knuckle connecting rod connected in the ordinary manner to the spindles 4 of the front wheel 5.

On the transverse steering knuckle connecting rod 3 are clamps 6 positively secured to said knuckle rod through the medium of a nut and bolt connection 7 passing through the clamping jaws 8. This clamp is of substantially L form and the horizontal arm 9 is secured to the terminal thereof and swivel eye 10, the purpose of the latter will be fully set forth as the description of the invention is proceeded with.

The lamps 11 are connected or mounted on the hollow tubular lamp standards 12 for both the rotary and vertical movement. In carrying out the invention to impart to the lamps both a vertical and horizontal movement and further to facilitate the headlights of the vehicle turning to throw their rays at an angle to the car whenever the wheels of the car are turned to steer the same, use is made of a specially constructed lamp standard and a novel construction of lever arm; the lever arm is here denoted by the character 13. The lever arm 13 is of L-shaped construction embodying a short horizontal portion or arm 14 and a long vertical arm 15. The portion 15 of the lever arm, better shown in Figure 3 of the drawings, is provided with a vertical groove 16, aligning with a vertical groove or guide 17 provided in the tubular lamp standard. To establish a positive rotary movement between the lamp standard and the steering knuckle rod 3, of the steering mechanism for the vehicle and to permit at the same time of vertical movement of the lamp standards so that injury cannot occur to the headlamps when the vehicle travels over rough surfaces, I employ a key 18. This key is fitted into the slots 16 and 17 of the lever arm and lamp standards respectively. The short horizontal arm 14 of the lever arm 13 is loosely fitted within the swivel eye 10, to permit of a pivotal movement of the lever arm with the bracket 6 of the steering knuckle rod 3.

A clamp 19, better shown in Figure 4 of the drawing, tends to connect the lamp standards to the frame 2 of the vehicle to prevent any undue vibration or jar imparted thereto in the course of travel of the vehicle over rough and uneven surfaces. Again the lamp standards are secured to the skirts 20 of the fenders by the usual cross-brace construction 21.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention what I claim as new is:—

A headlight control for automobiles comprising a bracket secured to the connecting rod of the steering mechanism of the automobile and having an eye swivelled to the forward end of the bracket, an L-shaped lever having the end of its horizontal portion engaging the eye of the bracket for slidable movement therein and the vertical portion thereof being provided for the greater portion of its length with a slot, a slotted lamp standard receiving the vertical portion of the arm and the slot of said arm being aligned with the slot of the lamp standard, and a key detachably engaging the aligned slots whereby the standard will be moved in unison with the L-shaped lever.

In testimony whereof I affix my signature.

CHARLES EDWARD BEAULAC.